(12) United States Patent
Yamaguchi

(10) Patent No.: US 8,049,920 B2
(45) Date of Patent: Nov. 1, 2011

(54) IMAGE FORMING SYSTEM AND BOOK BINDING APPARATUS

(75) Inventor: Hiroshi Yamaguchi, Hachioji (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 1240 days.

(21) Appl. No.: 11/733,021

(22) Filed: Apr. 9, 2007

(65) Prior Publication Data

US 2008/0002235 A1    Jan. 3, 2008

(30) Foreign Application Priority Data

Jun. 28, 2006 (JP) ................. 2006-177806

(51) Int. Cl.
*G06K 15/00* (2006.01)
*G06F 3/12* (2006.01)
(52) U.S. Cl. ....... 358/1.18; 358/1.13; 358/1.6; 358/1.15
(58) Field of Classification Search ................... 358/1.6, 358/1.18, 1.1, 1.9, 1.13, 1.15, 1.16, 1.17, 358/501, 401, 443, 1.2, 1.5, 1.11, 1.14, 540, 358/537, 530, 527, 468, 448, 452, 474, 475, 358/296; 347/2, 3, 5, 14, 23; 355/23, 24, 355/25, 81, 82; 399/1, 8, 361, 362, 363, 399/364, 365, 374, 380, 403, 407, 408, 409, 399/410; 715/700; 345/594, 156, 173, 530, 345/204, 1.1, 3.1, 4, 5, 30
See application file for complete search history.

(56) References Cited

U.S. PATENT DOCUMENTS

| 2002/0041405 A1* | 4/2002 | Kutsuwada et al. ........... 358/514 |
| 2005/0157341 A1* | 7/2005 | Levine .......................... 358/1.18 |
| 2005/0232656 A1 | 10/2005 | Asai et al. |

FOREIGN PATENT DOCUMENTS

| JP | 07-321967 | 12/1995 |
| JP | 08-220943 | 8/1996 |
| JP | 09-179450 | 7/1997 |
| JP | 11-167318 | 6/1999 |
| JP | 2001-134147 | 5/2001 |
| JP | 2003-259051 | 9/2003 |
| JP | 2004-209869 | 7/2004 |
| JP | 2005-321757 | 11/2005 |

OTHER PUBLICATIONS

Notice of Reasons for Refusal dated Sep. 28, 2010, issued in the corresponding Japanese Patent Application No. 2006-177806, and an English Translation thereof.

* cited by examiner

*Primary Examiner* — Dov Popovici
(74) *Attorney, Agent, or Firm* — Buchanan Ingersoll & Rooney PC

(57) ABSTRACT

An image forming system, including: an image reading section, which is capable of reading-in an image of a book original; a memory section to memorize read-in image data; an image forming section to form images on sheets to be a book body and on a cover sheet based on the image data; a book binding apparatus to form a book by covering a bundle of the sheets, on which the images are formed, with the cover sheet in U-shape; an inputting section to input reading conditions of the book original and outputting conditions of the book binding apparatus; and a control section to automatically set the outputting conditions based on a setting of the reading conditions inputted through the inputting section.

5 Claims, 16 Drawing Sheets

FIG. 9

| CONDITION | READING CONDITION OF BOOK ORIGINAL (A421) | | | IMAGE FORMING APPARATUS / CASE BINDING APPARATUS OUTPUTTING CONDITION (A46) | | | | | | | |
|---|---|---|---|---|---|---|---|---|---|---|---|
| | COVER SHEET (A422) | | STITCHING DIRECTION (A443) | COVER SHEET IMAGE (A441) | COVER SHEET IMAGE FACE (A442) | IMAGE FACE OF COVER SHEET | | | | | STARTING POSITION OF IMAGE FORMATION FOR CONTENT IMAGE DATA |
| | STITCHING DIRECTION | FRONT COVER SHEET (OUTSIDE) | BACK COVER SHEET (OUTSIDE) | | | | FRONT COVER SHEET (OUTSIDE) FRONT FACE OF SHEET | FRONT COVER SHEET (INSIDE) REAR FACE OF SHEET | BACK COVER SHEET (INSIDE) REAR FACE OF SHEET | BACK COVER SHEET (OUTSIDE) FRONT FACE OF SHEET | |
| 1 | LEFT | NO READING | NO READING | LEFT | PRESENT | SINGLE FACE | NO IMAGE | WITH IMAGE | WITH IMAGE | NO IMAGE | FRONT COVER SHEET (INSIDE) |
| 2 | LEFT | READING | NO READING | LEFT | PRESENT | DOUBLE FACES | WITH IMAGE | WITH IMAGE | WITH IMAGE | BLANC SHEET IMAGE | FRONT COVER SHEET (INSIDE) |
| 3 | LEFT | READING | READING | LEFT | PRESENT | DOUBLE FACES | WITH IMAGE | WITH IMAGE | WITH IMAGE | WITH IMAGE | FRONT COVER SHEET (INSIDE) |
| 4 | RIGHT | NO READING | NO READING | RIGHT | PRESENT | SINGLE FACE | NO IMAGE | WITH IMAGE | WITH IMAGE | NO IMAGE | FRONT COVER SHEET (INSIDE) |
| 5 | RIGHT | READING | NO READING | RIGHT | PRESENT | DOUBLE FACES | WITH IMAGE | WITH IMAGE | WITH IMAGE | BLANC SHEET IMAGE | FRONT COVER SHEET (INSIDE) |
| 6 | RIGHT | READING | READING | RIGHT | PRESENT | DOUBLE FACES | WITH IMAGE | WITH IMAGE | WITH IMAGE | WITH IMAGE | FRONT COVER SHEET (INSIDE) |

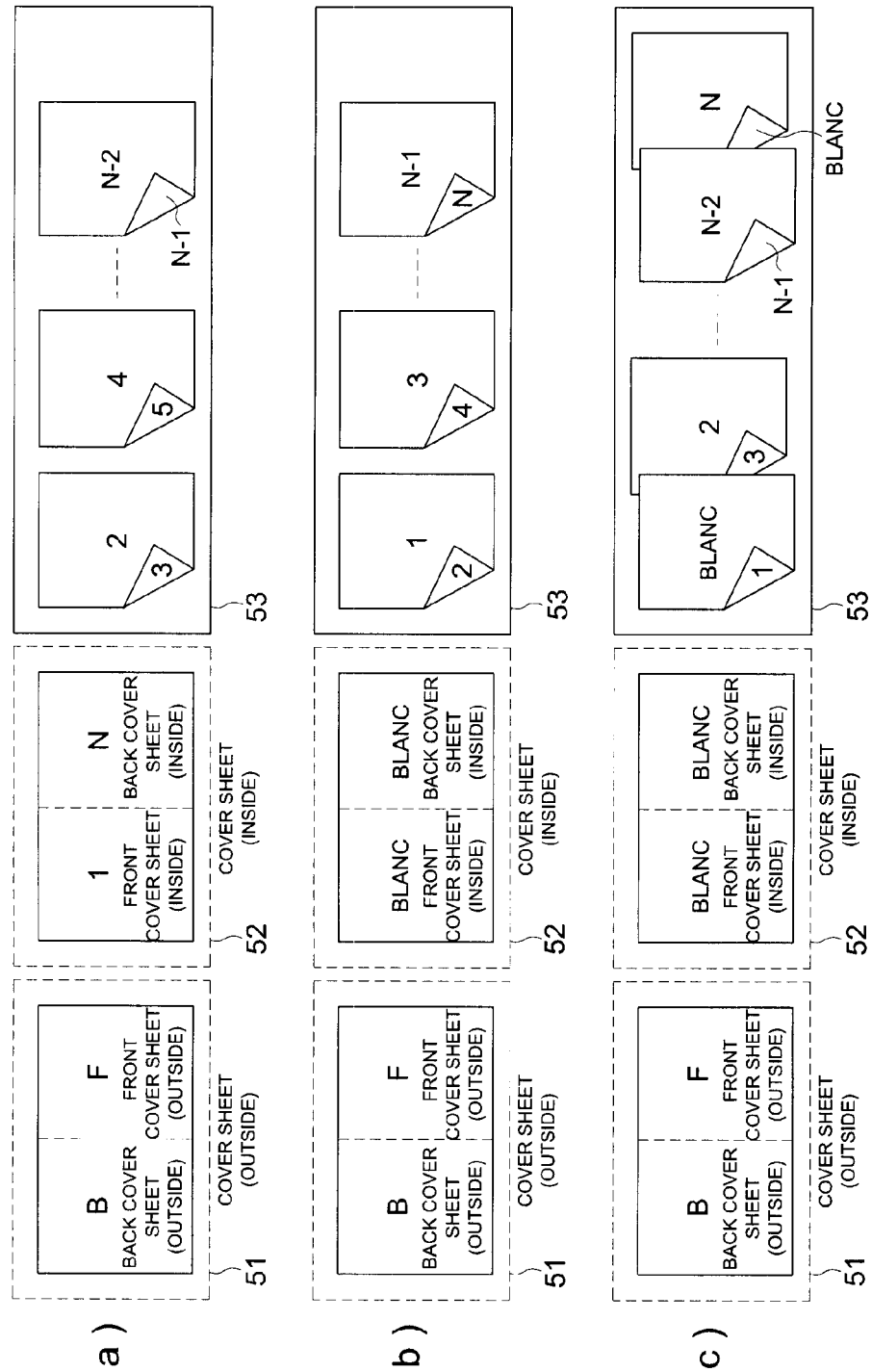

FIG. 15 (a)　　　FIG. 15 (b)
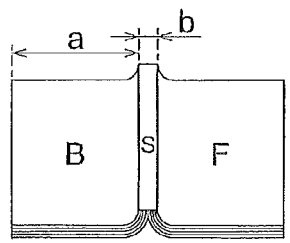 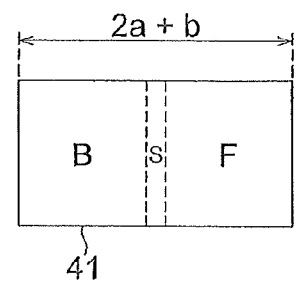
FIG. 16 (a)
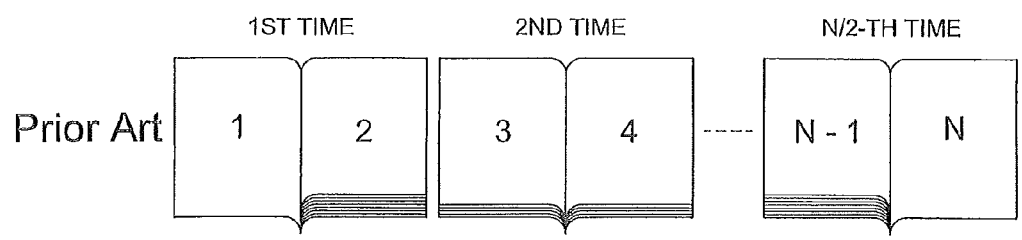
FIG. 16 (b)
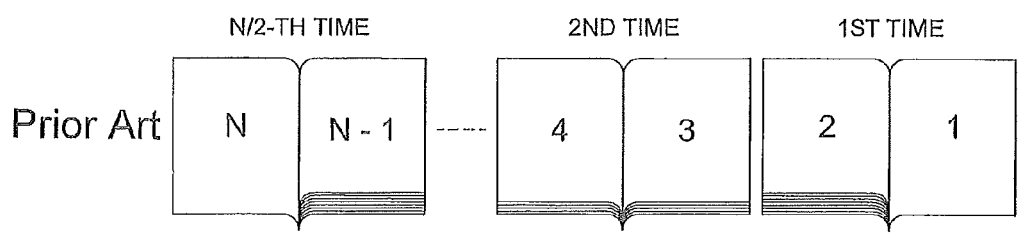
FIG. 16 (c)
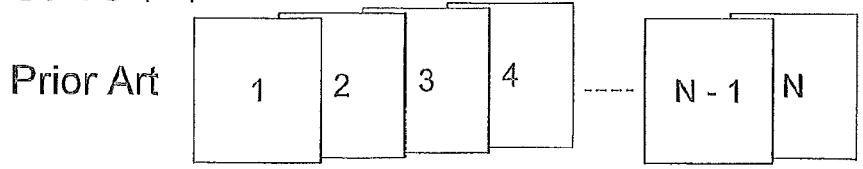

Prior Art

IMAGE FORMING SYSTEM AND BOOK BINDING APPARATUS

CROSS REFERENCE TO RELATED APPLICATION

The present application is based on Japanese Patent Application No. 2006-177806 filed with Japan Patent Office on Jun. 28, 2006, the entire content of which is hereby incorporated by reference.

BACKGROUND OF THE INVENTION

1. Technical Field

The present invention relates to an image forming system, which performs book binding by covering a bundle of sheets with a cover sheet formed in U-shape, and a control program of the image forming system.

2. Description of Related Art

Conventionally, in some cases, copies are made from book originals by electrophotographic image forming apparatuses, such as copiers, facsimile machines and printers.

Regarding a reading-out method of book originals, generally known is a so-called book copy function in which each of right and left pages is read out by a single scanning of two-page spread original.

A specific example of a conventionally known book copy function will be described by referring to drawings. FIGS. 16(a)-(c) are explanatory drawings showing relations between image data and a book original, which are read-out by utilizing the book copy function. FIG. 16(a) shows a left side stitched book original (may be called a left opening book original), and FIG. 16(b) shows a right side stitched book original (may be called a right opening book original).

FIG. 16(c) shows a condition of image data which are read-out by placing the book original on an original platen such that page 1 and page 2, page 3 and page 4, page N−1 and page N are respectively in two page spread state, and by reading-out respective image data of page 1 to page N through a single scanning of the two-page spread original. As shown in FIGS. 16(a)-(c), by using the book copy function, image data of N pages can be obtained with N/2 times scanning.

Regarding an outputting method of the book original, generally known is an image forming system which performs a simple case-binding process by encasing a bundle of sheets (hereinafter, the bundle of sheets which is to be encased with the cover sheet may be called as book body), on which images are formed by using a copier or printer, with a cover sheet formed in U-shape, and by gluing a spine of the bundle of sheets and a cover sheet (please refer to Unexamined Japanese Patent Application Publication No. 2004-209,869).

FIGS. 17(a) and (b) show an example of a book formed by a book binding apparatus. FIG. 17(a) shows a condition where cover sheet S2 is not yet folded, and FIG. 17(b) shows a condition where cover sheet S2 is folded. S3 is structured of a bundle of sheets S1 (book body) and a cover sheet S2, and the bundle of sheets S1 (book body) is encased by cover sheet S2 in U-shape. A configuration like S3 is also called a case-bound book. As shown in FIG. 17(b), cover sheet S2 structured of front cover sheet area F, spine area S, back cover sheet area B, outside front cover sheet F1, inside front cover sheet F2, outside back cover sheet B1, and inside back cover sheet B2.

In an image forming system performing a case-binding process, in case of copying book originals, it is sometimes required to obtain an output of the same configuration as that of the book originals.

However, in case of using the conventional book copy function, there have been problems that reading-in of a cover sheet image cannot be properly performed. Namely the problem is that, regarding book originals having a large thickness, a printed output of the cover sheet including the spine cannot be obtained, and the problem that to arrange images adequately on inside cover sheet area is difficult.

Further, in the image forming system described in Unexamined Japanese Patent Application Publication No. 2004-209,869, there is the problem that, in case of performing a combination of the book copy function and the case-binding process, correct output cannot be obtained unless both condition settings are compatible, and setting these conditions setting is troublesome.

In consideration of the above-mentioned problems, an objective of the present invention is to obtain an image forming system and a control program to control the image forming system, which is capable of outputting a book having the same configuration as that of the book original when coping the book original.

SUMMARY

An embodiment reflecting one aspect of the present invention to solve the problems described above is an image forming system, comprising: an image reading section, which is capable of reading-in an image of a book original; a memory section to memorize read-in image data; an image forming section to form images on sheets to be a book body and on a cover sheet based on the image data; a book binding apparatus to form a book by covering a bundle of the sheets, on which the images are formed, with the cover sheet in U-shape; an inputting section to input reading conditions of the book original and outputting conditions of the book binding apparatus; and a control section to automatically set the outputting conditions based on a setting of the reading conditions inputted through the inputting section.

An embodiment reflecting another aspect of the present invention is an image forming system, comprising: an image reading section, which is capable of reading-in an image of a book original; a memory section to memorize read-in image data; an image forming section to form images on sheets to be a book body and on a cover sheet based on the image data; a book binding apparatus to form a book by covering a bundle of the sheets, on which the images are formed, with the cover sheet in U-shape; an inputting section to input a setting of reading conditions of the book original, and a setting of outputting conditions of the book binding apparatus; and a control section to determine consistency of the setting of outputting conditions with the setting of reading conditions, both the settings having been inputted through the inputting section.

BRIEF DESCRIPTION OF THE DRAWINGS

These and other objects, advantages and features of the invention will become apparent from the following description thereof taken in conjunction with the accompanying drawings in which:

FIG. 9 is a chart showing the relationship between reading conditions and outputting conditions;

FIGS. 14(*a*)-(*c*) are charts showing the relationship between settings of the starting positions for content image and their outputting conditions;

FIGS. 15(*a*)-(*b*) are charts explaining the method of determining the size for whole cover sheet image reading based on thickness information;

FIGS. 16(*a*)-(*c*) are charts showing the relationship between the image data and the book original read by using the book copy function;

DETAILED DESCRIPTION OF THE PREFERRED EMBODIMENTS

Figure 1:
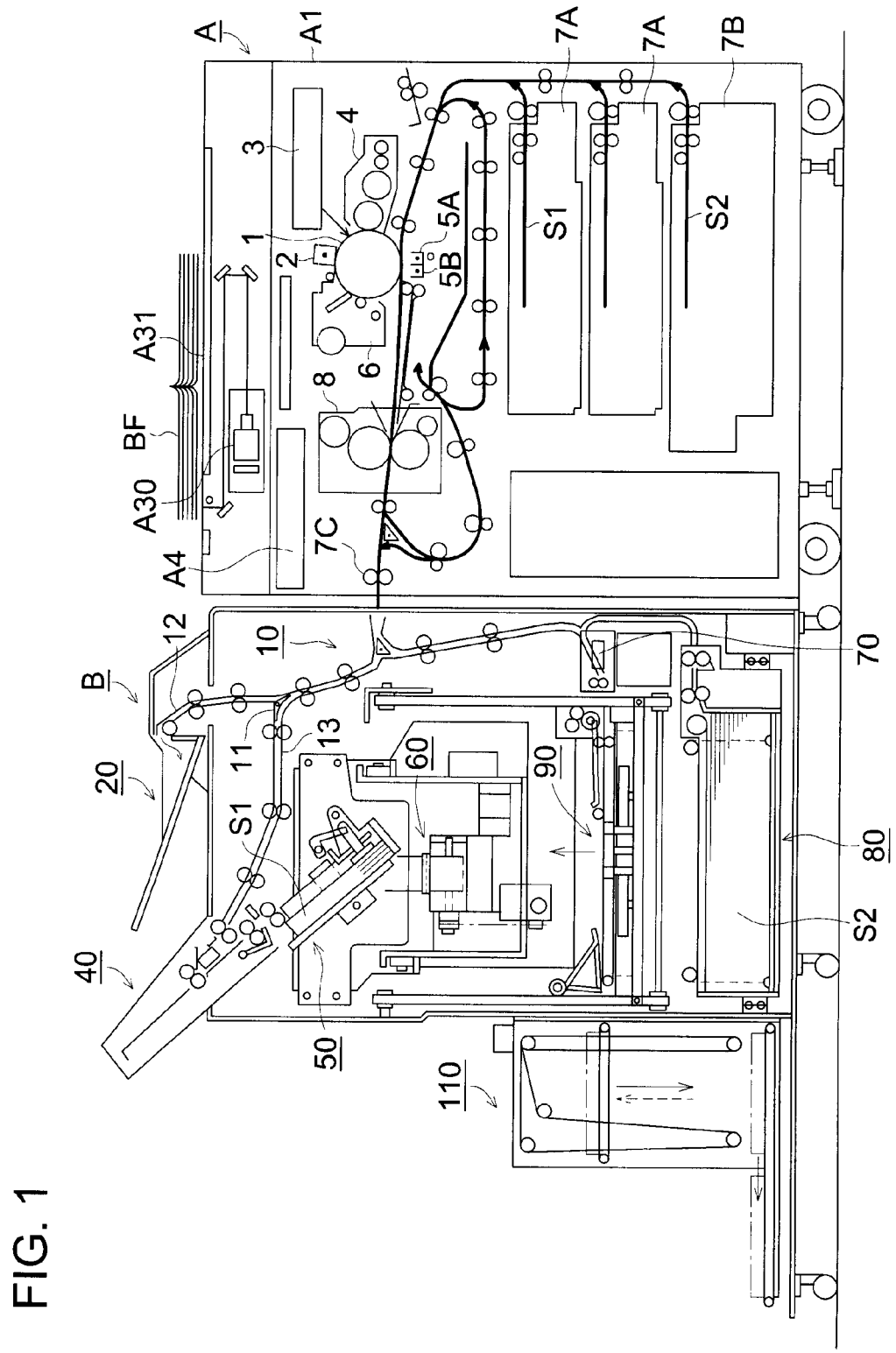
FIG. 1 is a central section view of an image forming system.

FIG. 1 is a central section view of an image forming system.

The image forming system comprises image forming apparatus A and book binding apparatus (also called case-binding apparatus) B. Image forming apparatus A is for forming images on sheets by utilizing an electrophotographic method, and includes image forming section A1 and image reading section A30.

In image forming section A1, 1 indicates a drum-shaped photosensitive material, 2 indicates a charger unit to uniformly charge the surface of photosensitive material 1, 3 indicated an exposure unit to imagewise expose photosensitive material 1, 4 indicates a developing unit to develop the electrostatic latent image formed by the exposure on photosensitive material 1 to form a toner image, 5A indicates a transfer unit to transfer the toner image formed on photosensitive material 1 onto a sheet of recording medium, 5B indicates a separating unit to separate the image carrying sheet from photosensitive material 1, 6 indicates a cleaning unit to clean the surface of photosensitive material, and 8 indicates a fixing unit for heat-fixing the toner image onto the sheet.

Photosensitive material 1 rotates in clockwise direction, and through charging, exposure, and development, toner images are formed on photosensitive material 1, the toner images are transferred onto sheet S1 and cover sheet S2, both having been conveyed in synchronization with the image formation, and the transferred toner image is fixed to form fixed images on the sheets. After the toner image transfer, photosensitive material 1 is cleaned by cleaning unit 6.

Sheet S1, which is encased by cover sheet S2 to be the book body during case-binding, are stored in two sheet feeding trays 7A, and cover sheets S2 are stored in sheet feeding tray 7B and cover sheet storing section 80 in book binding apparatus B. Sheet S1 and cover sheet S2 are respectively fed one by one from sheet feeding trays 7A and 7B and conveyed to image forming section A1. Sheet S1 and cover sheet S2, on both of which toner images have been transferred, pass through fixing unit 8 to be fixed. After the fixing process, sheet S1 and cover sheet S2 are ejected outside image forming apparatus A from exit roller 7C.

Book binding apparatus B stacks a plurality of sheets S1 fed from image forming apparatus A to form a bundle of printed sheets (book body), and adheres cover sheet S2 to encase the book body in U-shape to form a book. Book binding apparatus B has sheet reversing section 40, stacking section 50, coating section 60, trimming section 70, and connecting section 90 in which the cover sheet is adhered onto the bundle of sheets, and further has conveying section 10, ejection tray 20, cover sheet storing section 80, and book ejection section 110.

Sheets S1 discharged from image forming apparatus A are either discharged to the ejection tray 20 via the ejection path 12, or are conveyed to sheet reversing section 40 via the switching gate 11 provided in conveying section 10. If the mode of operation is not the case-binding mode, content sheets S1 are discharged to the ejection tray 20. In the case-binding mode of book binding apparatus B, the sheets S1 are conveyed to the sheet reversing section 40 via conveying path 13, and, after being switched back in sheet reversing section 40, they are conveyed to the stacking section 50. In stacking section 50, sheets S1 are stacked, stacking section 50 is rotated when the number of stacked sheets reached to the set number, and the bundle of sheets S1 (book body) is held in an almost vertical condition. Then, adhesive is coated by coating device 60 onto the bottom surface, being the spine of the bundle of sheets S1 (book body), and cover sheet S2 is brought into contact with bundle of sheets S1 (book body) to be adhered. Case-bound book S3 formed by adhering cover sheet S2 onto the bundle of sheets S1 (book body) is ejected to book ejection section 110. If cover sheet S2 is excessively large, it is trimmed by trimming section 70 to be the proper size.

Image reading section A30 reads-in book original BF. Book original BF, placed on original platen A31 is exposed to scanning exposure by an optical system of original image scanning exposure unit, to be read by a line image sensor. Analogue signals obtained by photoelectric conversion by the line image sensor are processed by a control section such as with analogue processing, A/D conversion, shading correction, and image compression, and then stored in a memory section as image data or inputted to exposing unit 3.

A4 is an inputting section, which is provided with an LCD for various displaying of the apparatus, for performing input of various operations. Operation instructions are inputted through touching by an operator at certain positions on the touch-panel arranged superimposed on the LCD.

FIGS. 2(*a*)-(*d*) are drawings showing the process of coating an adhesive onto a bundle of sheets S1 (book body).

Number 502 indicates a first holding member, while number 503 indicates a second holding member, and bundle of sheets S1 is sandwiched and held by the two holding members. Number 63 indicates an adhesive agent, 62 indicates a coating roller to coat the adhesive agent on the spine of bundle of sheets S1. Next, the coating process of the adhesive agent will be described.

By motor M1, which being a moving means, second holding member 503 is moved toward content sheets S1, and when second holding member 503 presses sheets S1 with a certain pressure, a torque sensor (not illustrated) detects increase of the driving torque, and the movement of second holding member 503 stops. By such a configuration, the bundle of sheets S1 is firmly sandwiched and held with first holding member 502 and second holding member 503. Moving distance of second holding member 503 corresponding to its position is measured by encoder 509 (thickness measuring section), and is memorized in a memory means such as a RAM. The thickness of the bundle of sheets S1 is calculated by the position of second holding member 503 against first holding member 502.

Figure 2A:
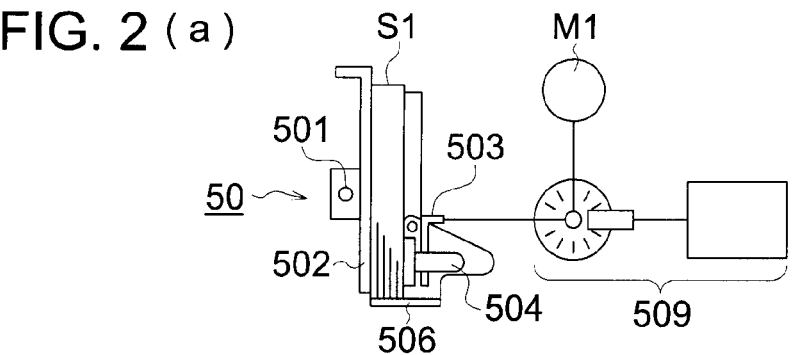
FIGS. 2(a)-(d) are drawings showing the process of coating an adhesive on a bundle of sheets S1 (book body)
Figure 2B:
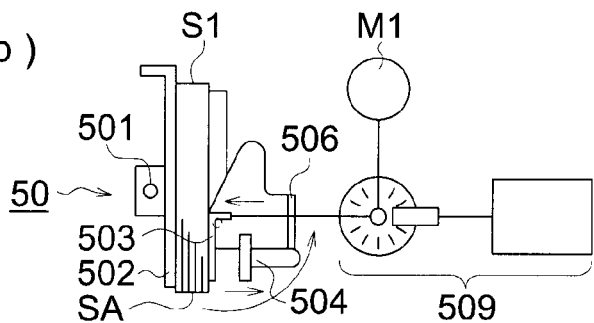
Figure 2C:
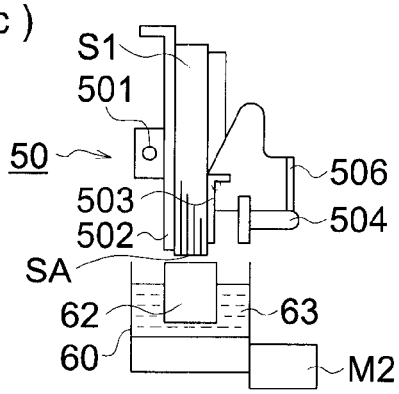

During the step where the bundle of sheets S1 (book body) is held by first holding member 502 and second folding member 503, receiving plate 506 is rotated 90° by a driving mechanism (not illustrated), and evacuated as shown in FIG. 2(b). At the step where receiving plate 506 is evacuated, coating roller 62 does not contact bottom surface SA of the bundle of sheets S1 (please refer to FIG. 2(c)).

Figure 2D:
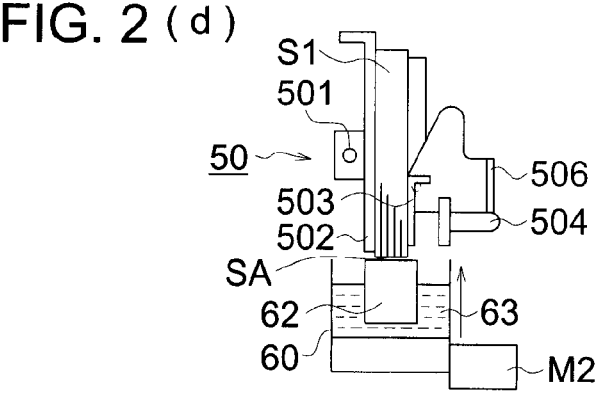

Next, as shown in FIG. 2(d), coating section 60, containing adhesive agent 63, rises to make coating roller 62 contact with bottom surface SA, which is to be the spine of the bundle of sheets S1, and coating section 60 moves along bottom surface SA of the bundle of sheets S1 to coat adhesive agent 63 on bottom surface SA. Coating roller 62 is driven by motor M2.

Figure 3:
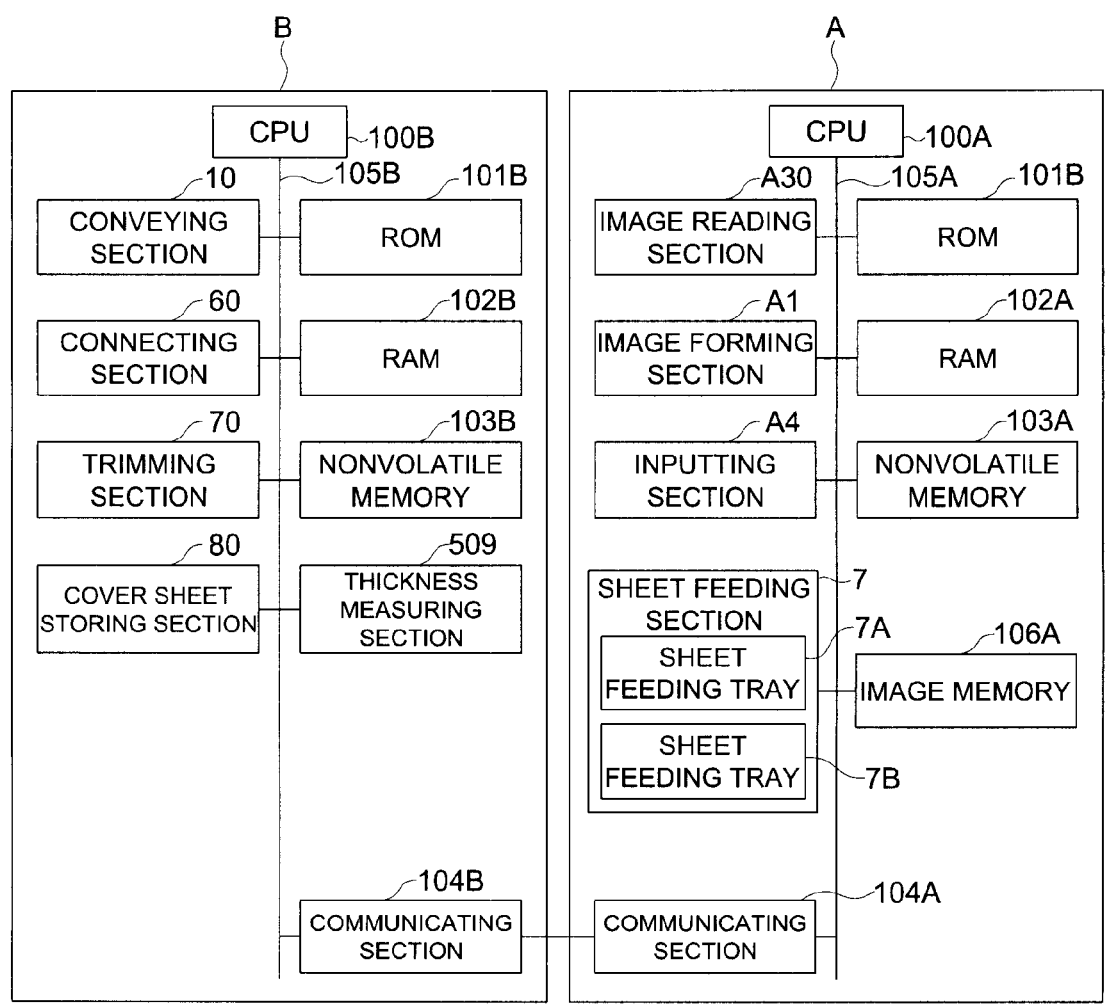
FIG. 3 is a control block diagram of the image forming system.

FIG. 3 is a control block diagram of the image forming system. In FIG. 3, only the measure sections to explain the present embodiment are illustrated, and other well-known sections of the image forming system are omitted. Further, in the following drawings, to avoid duplication of explanation, the same designation is attached to the common parts to replace the explanation.

Sign 100A indicates a CPU, which functions as a control section to conduct various control of image forming apparatus A according to programs. 101A indicates a ROM, which stores various kinds of software programs and data including a program and data to control image forming apparatus A. 102A indicates a RAM, which is used by CPU 100A as a work area, and temporarily memorizes the program and data necessary to control image forming apparatus A. Then CPU 100A conducts the control of image forming apparatus A based on the program expanded in RAM 102A.

Here, the program relating to the present embodiment is described as one which is provided in image forming apparatus A or book binding apparatus B, however, the program may be provided in a personal computer connected to image forming apparatus A via a network such as a LAN, and the program in the personal computer may be controlled by image forming apparatus A via the network.

106A indicates an image memory as a memory section. Based on input through inputting section A4, image reading section A30 reads-in a book original to generate image data. The generated image data is processed by image forming apparatus A and is memorized in image memory 106A, or outputted to image forming section A1. Based on the image data processed by CPU 100A, image forming section A1 forms an image on a sheet. Sheet feeding section 7 conveys sheet S1 housed in sheet tray 7A, or cover sheet S2 housed in sheet tray 7B, toward image forming section A1. Inputting section A4, comprising such as a touch panel, performs displays of various operation screens, and inputs of instructions, etc.

104A indicates a communicating section, which is connected to book binding apparatus B to transmit and receive various data between book binding apparatus B. Via bus 105A, mutually connected are such as ROM 101A, RAM 102A, nonvolatile memory 103A, image reading section A30, image forming section A1, inputting section A4, sheet feeding section 7, and communicating section 104A as a transmitting section.

In book binding apparatus B, centering by CPU 100B, which conducts various control of book binding apparatus B based on programs, mutually connected via bus 105A are such as ROM 101B, RAM 102B, nonvolatile memory 103B, conveying section 10, connecting section 60, trimming section 70, cover sheet storing section 80, and communicating section (reception section). ROM 101B memorizes various kinds of programs and data, and CPU 100B utilizes these programs and data to control book binding apparatus B. RAM 102B is used by CPU 100B as a work area, and temporarily memorizes the program and data necessary for CPU 100B to control book binding apparatus B. Communicating section 104B is connected to image forming apparatus A to transmit and receive various data from image forming apparatus A.

Figure 4:
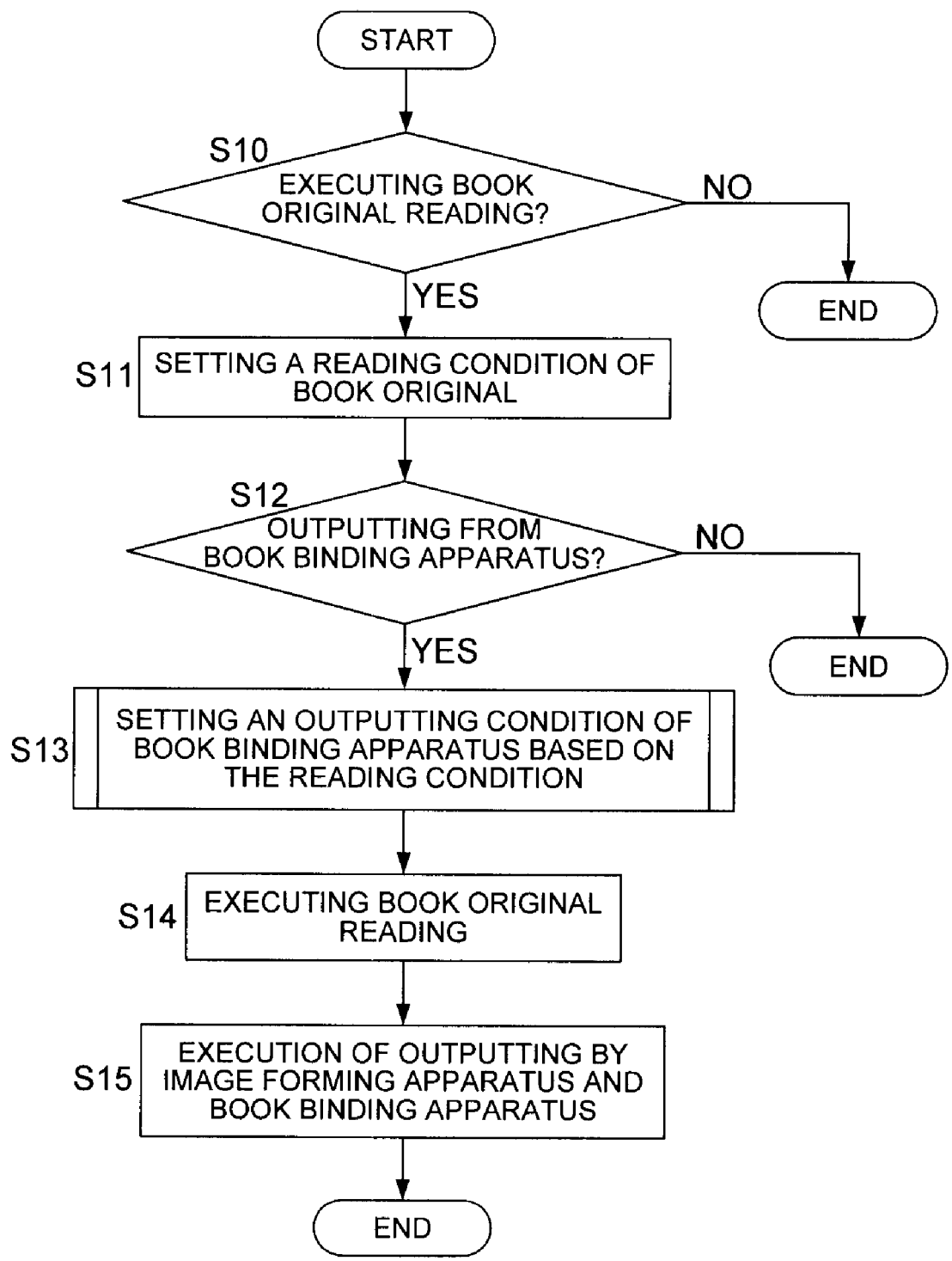
FIG. 4 is a flow chart showing the operation of the image forming system relating to the first embodiment.

FIG. 4 is a flow chart showing the operation of the image forming system relating to the first embodiment. Firstly, in case of conducting reading-in of book original (Yes in step S10), reading conditions of the book original are set (step S11). Next, in case of conducting case-binding to output a case-bound book (Yes in step S12), outputting conditions of the book binding apparatus are set (step s13).

In step S13, even when the operator does not set the outputting condition, based on the setting of the reading condition in step S11, the outputting condition is automatically determined by CPU 100A executing the program.

Then, based on the conditions set in step S11, reading of the book original is conducted (step S14). The read-in data are correlated with book information set in steps S11 and S13, and memorized in image memory 106A. Finally, image forming apparatus A conducts image formation with the data read-in in step S14 based on the outputting conditions set in step S13, and book binding apparatus B conducts case-binding to produce a book (step S15). In the following paragraphs, an actual setting procedure will be described referring to detailed drawings of display screen.

FIGS. 5 to 8 are detail charts of the display screen in inputting section A4.

Figure 5:
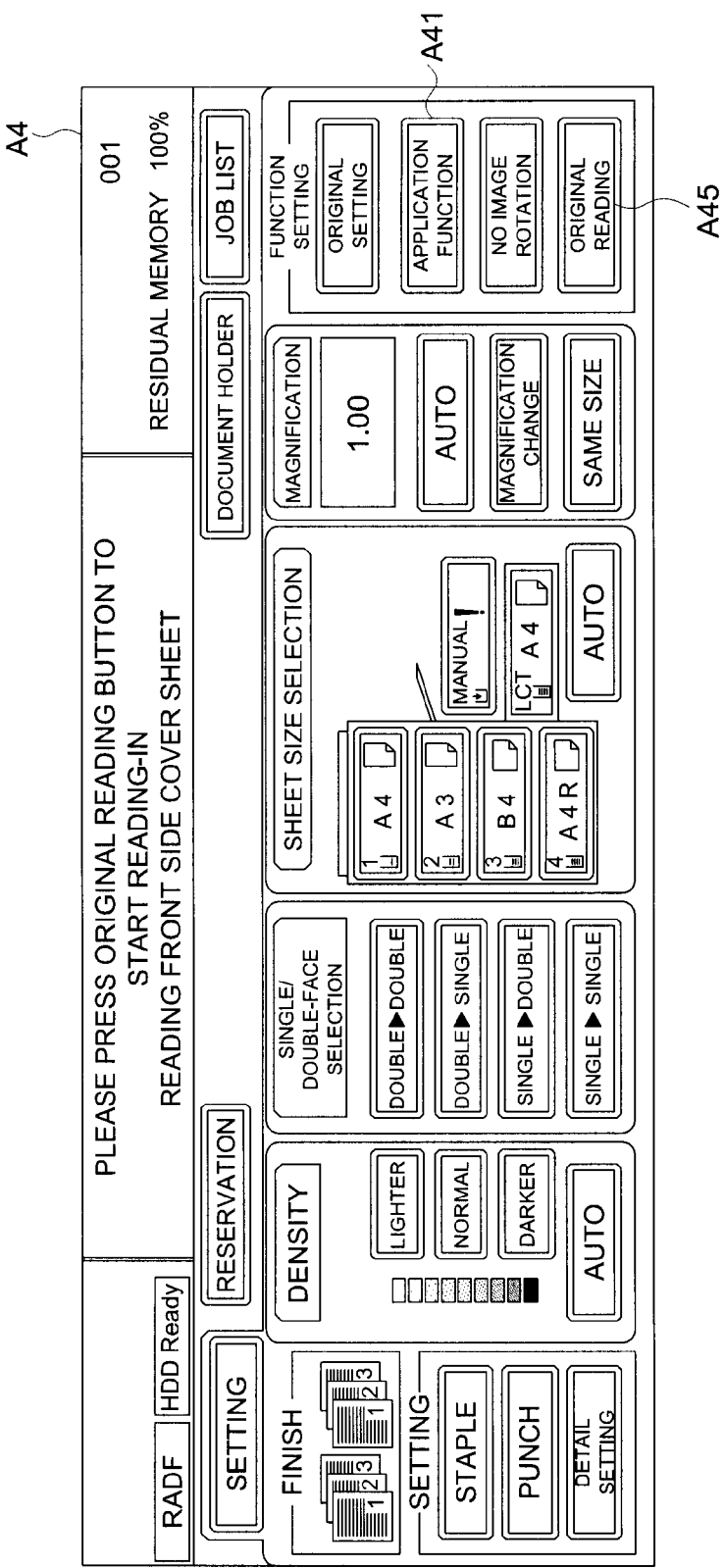
FIG. 5 is a chart detailing the display screen in inputting section A4.
Figure 6:
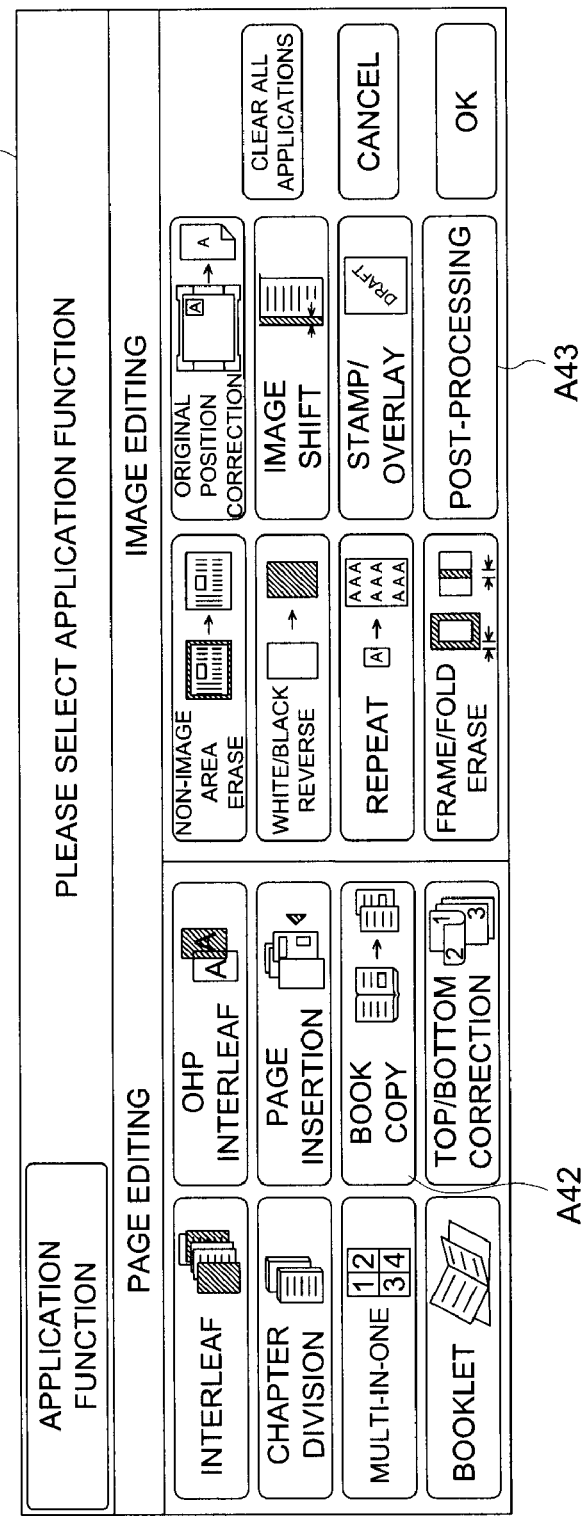
FIG. 6 is another chart detailing the display screen in inputting section A4.

FIG. 5 shows a basic screen of inputting section A4, which performs various displays and operations. When conducting case-binding processing, application function button A41 is initially pressed. When application function button A41 is pressed, a setting screen regarding the application functions is displayed as shown in FIG. 6. Next, book copy button A42 is pressed (procedures to this point correspond to S10).

Figure 7:
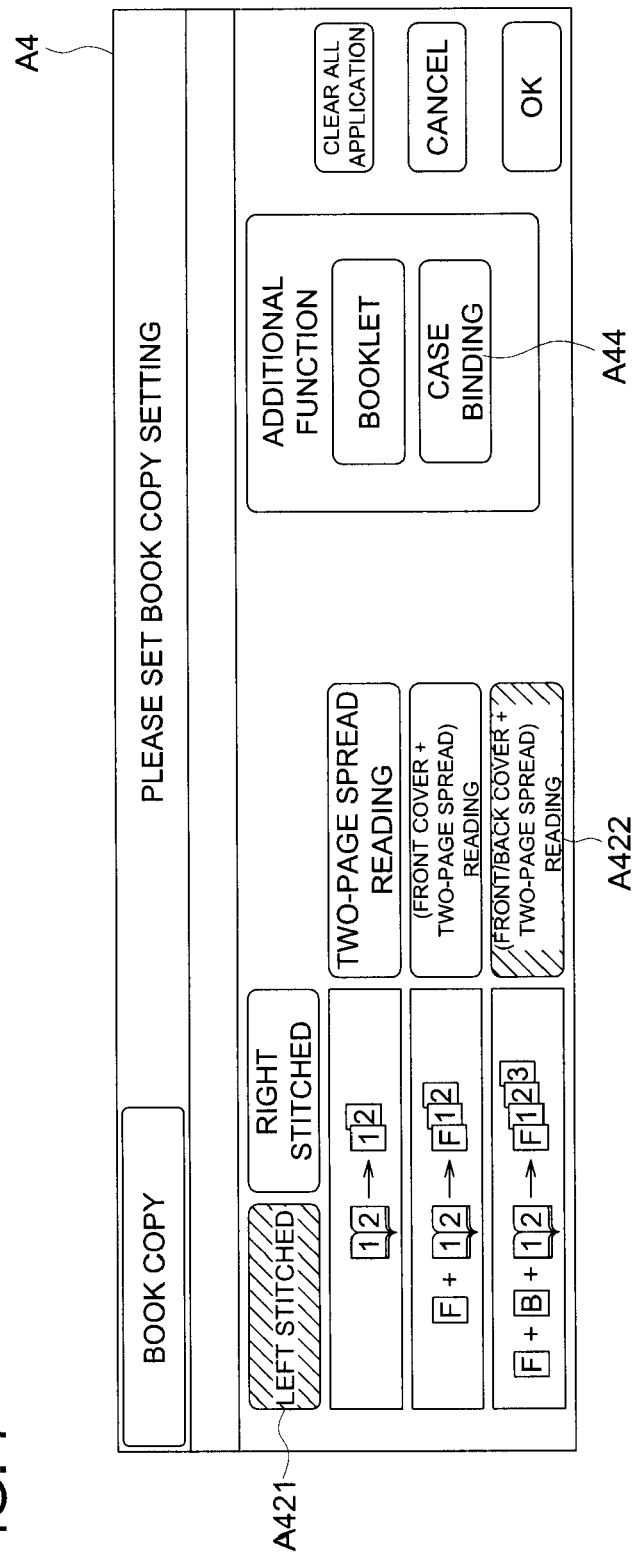
FIG. 7 is yet another chart detailing the display screen in inputting section A4.

When book copy button A42 is pressed, as shown in FIG. 7, a setting screen of inputting section to set reading conditions is displayed. On the setting screen, the reading condition of the book original is set by operating the touch panel of inputting section A4 (procedures to this point correspond to S11). In the example shown in FIG. 7, buttons of A421 and A422 are selected, indicating that the reading-in conditions of the book original is set such that a left side stitched book original is read-in with the condition of "front and back coversheets & two-page spread reading". This setting indicates that outside faces of the front and back cover sheets are separately read one-by-one with the book closed (not in a two-page spread state), and other original pages than the two outside faces of the cover sheets are read-in by two-page spread reading. Incidentally, "two-page spread reading" is the same as "book copy function", which means a function that a two-page spread original is read-in as image data of two separate left/right pages by a single scanning.

Subsequently, setting of case-binding output is conducted. When book binding apparatus B is used for the post processing, case-binding button A44 in FIG. 7 is pressed (these procedures to this point correspond to S12). Similar case-binding button can be selected from a setting screen (not illustrated), which appears by pressing post-processing button A43 in application function setting screen in FIG. 6.

Figure 8:
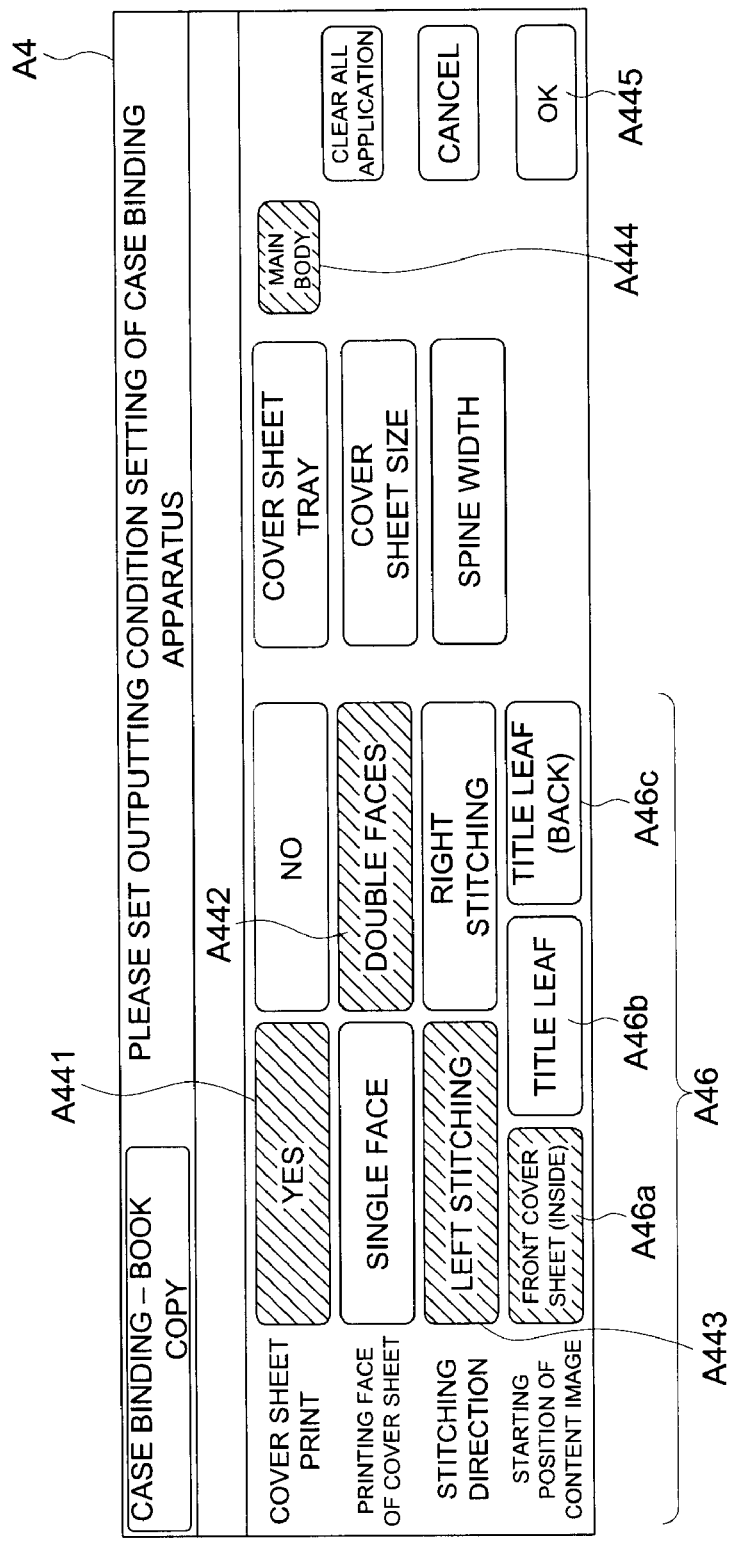
FIG. 8 is still another chart detailing the display screen in inputting section A4.

When case-binding button A44 is pressed, as shown in FIG. 8, a setting screen of inputting section to set an outputting condition of the book binding apparatus is displayed. Here, as shown in FIG. 8, buttons of A441 to A444, and A46a (buttons with hatched lines in FIG. 8) have been already set (or determined) previously to the operator's selection. This is caused by that CPU 100A functions as outputting condition determining section based on the program memorized in ROM 101A, and the outputting condition determining section determines the outputting conditions based on the reading conditions set in FIG. 7 (these procedures to this point correspond to S13).

FIG. 9 is a chart showing the relationship between reading conditions and outputting conditions. Designations A 421 to A 444, and A46a correspond to designations in FIGS. 7 and 8. Based on the setting conditions for stitching direction in reading condition A421, stitching directions of A443 in outputting condition is determined, and based on the setting conditions in A422, conditions of A441 and A442 are determined.

After setting the outputting condition, OK button A445 is pressed on the screen of FIG. 8, to return to the basic screen of FIG. 5. In the same way as the instruction procedures displayed on the screen display according to the reading conditions set on FIG. 5, the book original is placed on original platen 31, and original reading button A45 in FIG. 5 is pressed to read-in (scan) the book original (corresponding to step S14).

In this way, by determining the outputting conditions based on the reading conditions, it becomes possible for the operator to eliminate the setting operations of the outputting condition, and the image forming system can be attained which can easily output a book of the same configuration as the original in the case of copying a book original.

Figure 10:
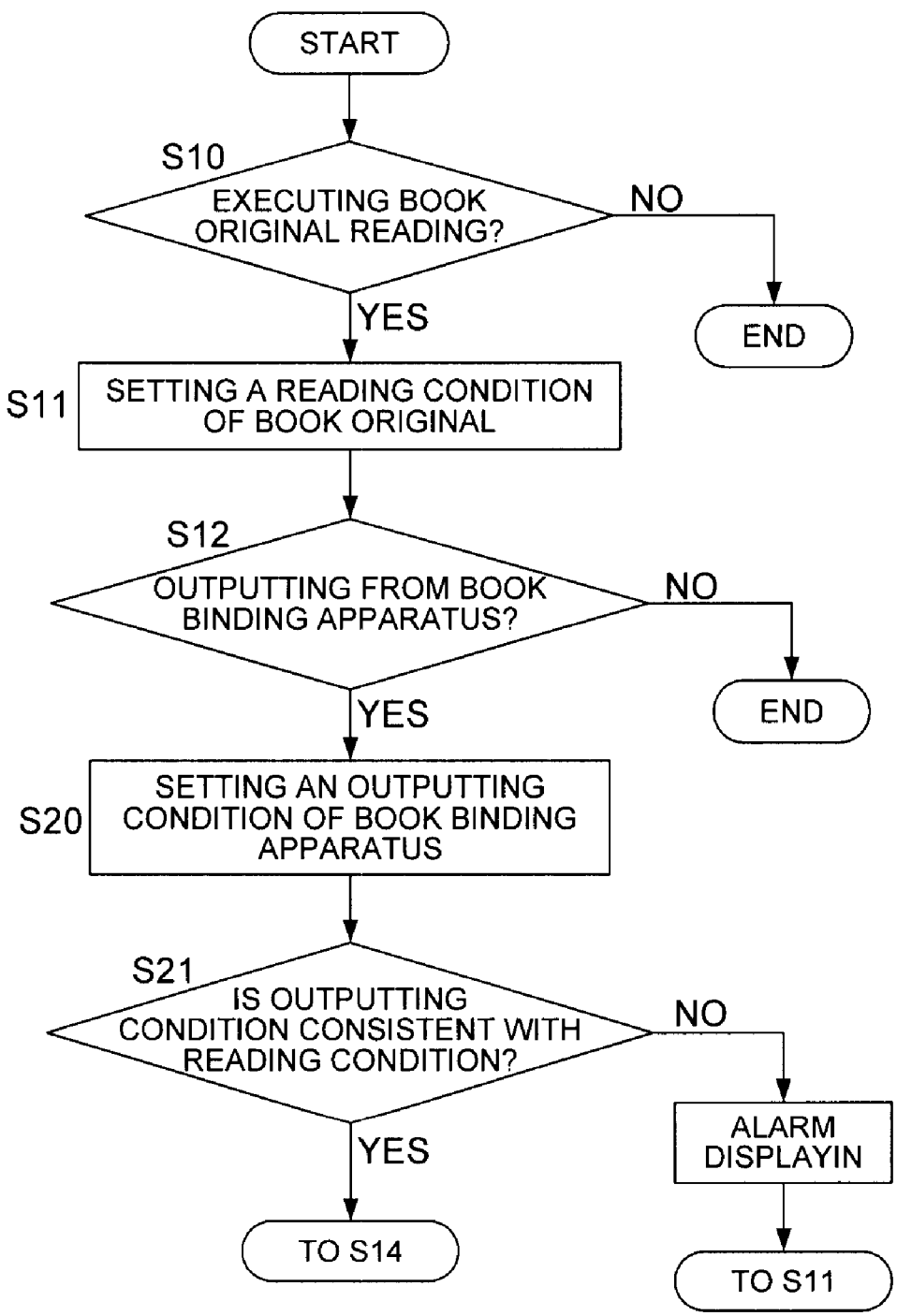
FIG. 10 is a flow chart showing the operation of the image forming system relating to the second embodiment.

FIG. 10 is a flowchart showing the operation of the image forming system relating to the second embodiment. In the following description, in order to avoid repetition of explanation, for parts common to that of flowchart in FIG. 4, the same designations are provided to replace the explanation.

In steps S10 to S12, reading conditions of the book original are set, and after that, outputting conditions of the book binding apparatus is set in step S20. In step S20, the outputting conditions are not automatically set but are set by the operator's input of the outputting conditions, which differs from step S13 of FIG. 4.

In the following step S21, consistency of the outputting condition with the reading condition is determined. The determination of consistency is executed regarding stitching directions, necessity of printing (image forming) on cover sheet, and print side selection of single or double sided printing when printing the cover sheet. The reading conditions set in step S11 are memorized in nonvolatile memory 103A of image forming apparatus A, and the outputting conditions set in step S20 are memorized in nonvolatile memory 103B of book binding apparatus B. Whether both conditions are mutually consistent or not is determined in CPU 100A and CPU 100B through communication sections 104A and 104B. When determined to be consistent (Yes in step S21), reading-in of the book original in step S14 is conducted. When determined to not be consistent (No in step S21), an alarm display is generated (step S22) to prompt the operator to change the setting condition.

In this way, by having a consistency determining section to determine the consistency of the setting of outputting condition with the setting of reading condition, it can be possible to prevent from outputting books of incorrect configuration due to erroneous condition setting. Further, when determined to be inconsistent, correct setting of outputting condition is ensured by the alarm display for prompting the user to change the setting condition.

In FIG. 10, the example is described in which a step cannot proceed to the following step until consistency is attained. However, not being restricted to this example, another option is possible, in which the operator is reminded by the alarm display in the case of inconsistency, but when such inconsistency is due to the user's intentional setting rather than an erroneous setting, the alarm display is canceled and the process can proceed to the following step. For example, there is a case where the book original is stitched on the left side, but the user wants to conduct right side stitching for the book binding.

Figure 11:
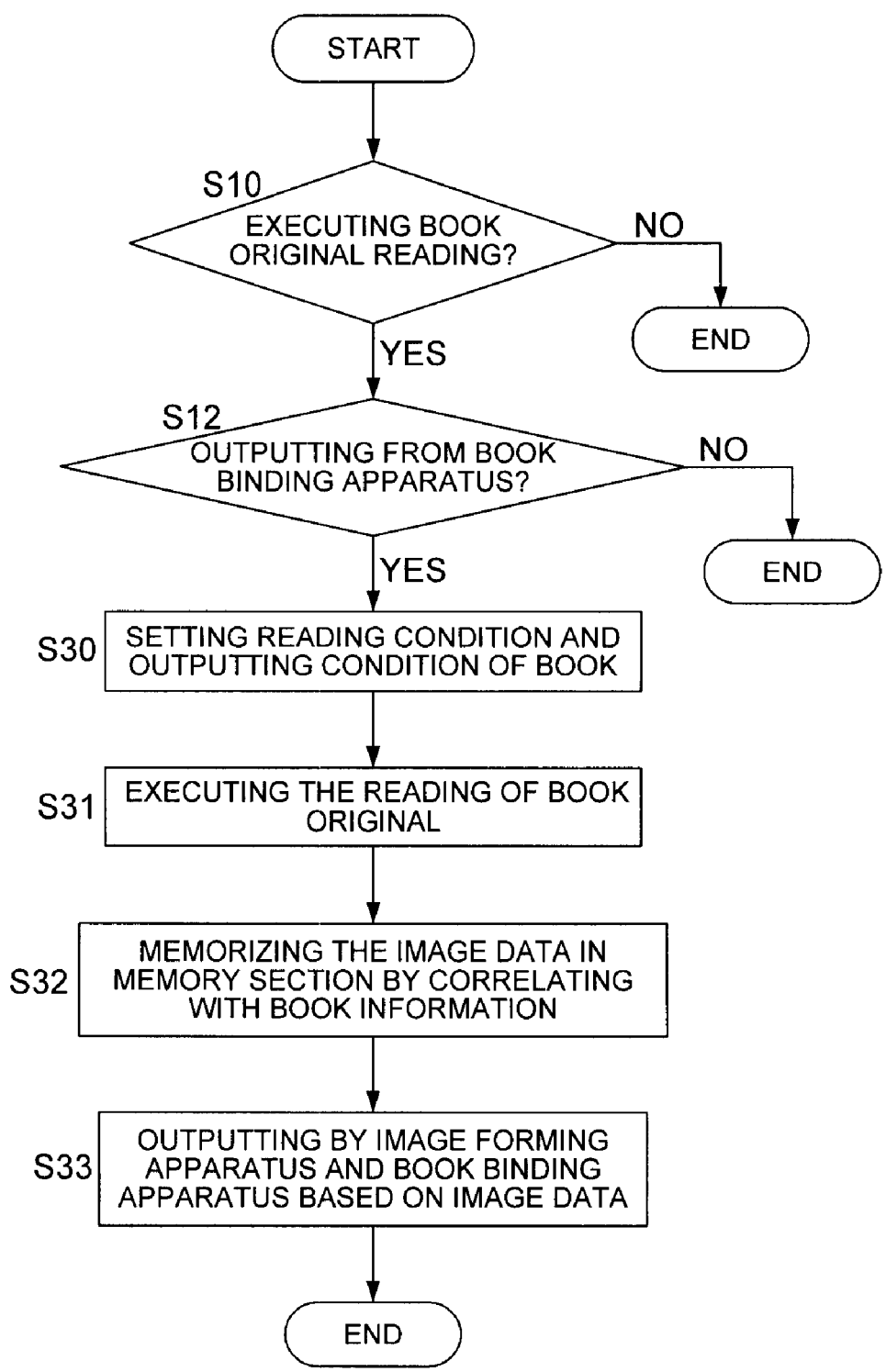
FIG. 11 is a flow chart showing the operation of the image forming system relating to the third embodiment.

FIG. 11 is a flow chart showing operations of the image forming system relating to the third embodiment. After selecting reading-in of the book original in step S10, and selecting to output by the book binding apparatus in step S12, settings of both reading conditions of the book original and outputting conditions of the book are conducted in step S30.

In step S30, the reading conditions are set in consideration of the outputting conditions of the book. In the case of conducting case-binding, the sheet size of cover sheet S2 (for example A3 extended size) needs to be at least two times greater than the sheet size of sheet S1 (in this example A4 size), and the reading condition settings based on respective sheet size are capable. An example of specific settings will be explained below while referring to the display screen.

Figure 12:
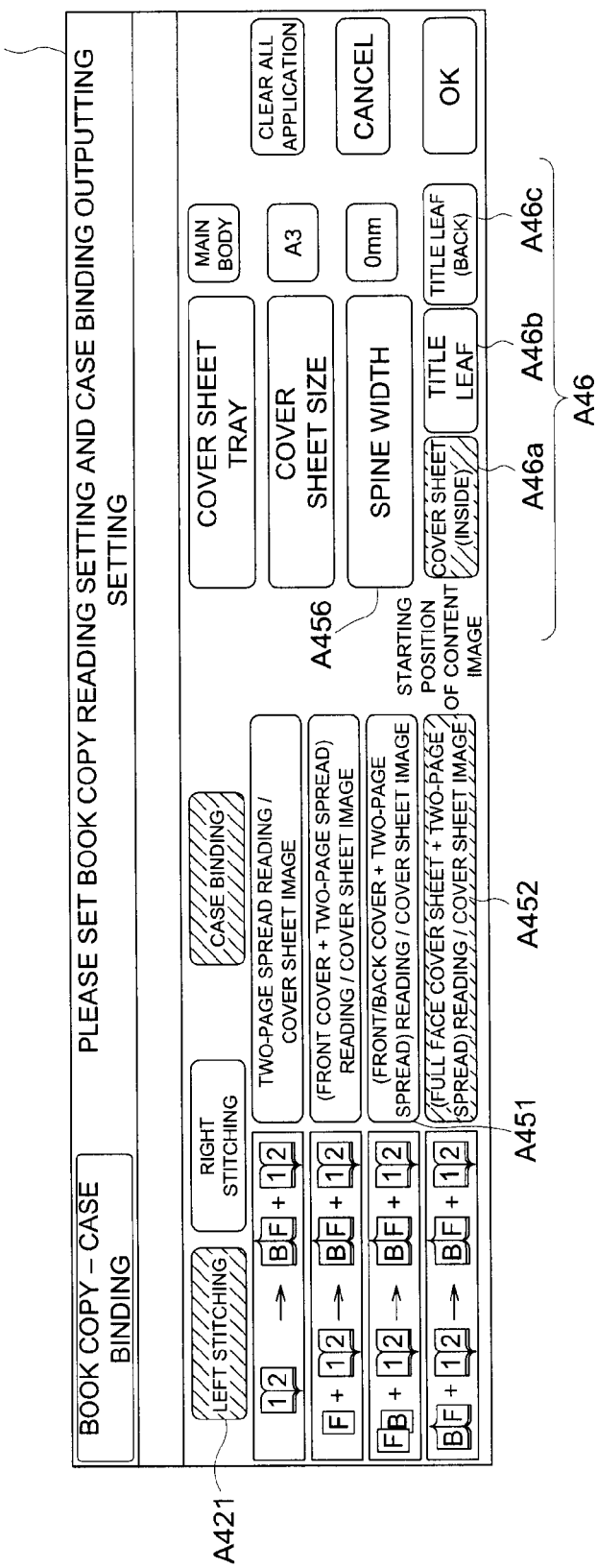
FIG. 12 is another chart detailing the display screen in inputting section A4.

FIG. 12 is a detail chart of the display screen in inputting section A4, when both the book copy and the case-binding processes are selected.

On the screen in FIG. 12, conducted are settings of reading conditions for the book original (book information), and outputting conditions by image forming apparatus A and book binding apparatus B. Here, the book information includes reading conditions of the book original and outputting conditions of book binding, and the book information specifically includes size of the book, stitching direction, need of cover sheet reading, width of the spine, size for cover sheet S2, and starting position of the content image. Further, two-page spread information includes whether the original is a book original in a two-page spread state, and page number information assigned to the image data according to the order when the image data having been read-in. In the example shown in FIG. 12, buttons A421 and A452 are selected. This means that the reading conditions are set such that the book original being "left side stitched" is read with "full face of cover sheet reading+two-page spread reading".

Returning to FIG. 11, explanation of operation flow will be continued. In step S31, reading of the book original is conducted based on the conditions set in step S31, then in step S32, the read-in image data is memorized in image memory 106A with correlated to the book information, and in following step S33, a book is produced, based on the memorized image data, by image forming apparatus A and book binding apparatus B. Control of these processing is conducted by CPU 100A based on the program stored in ROM 101A and the like. The explanation of steps S31 to S33 will be further clarified by using the explanatory drawings.

Figure 13A:
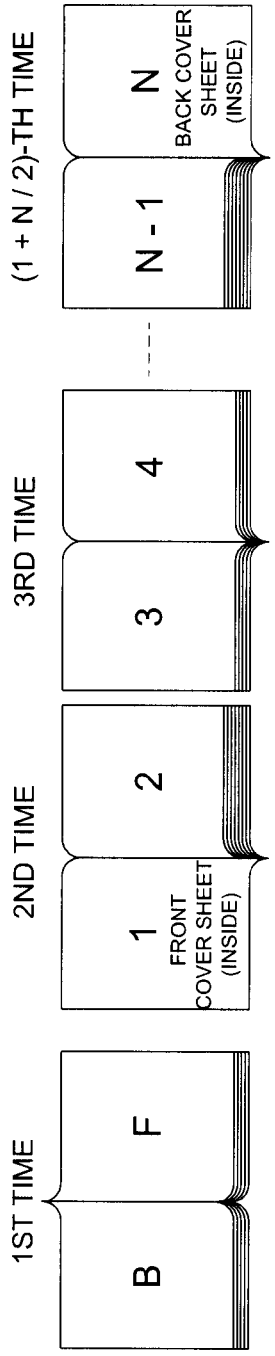
FIGS. 13(*a*)-(*c*) are charts showing the relationship between the reading of book original and outputting on cover sheet S2 and sheet S1.
Figure 13B:
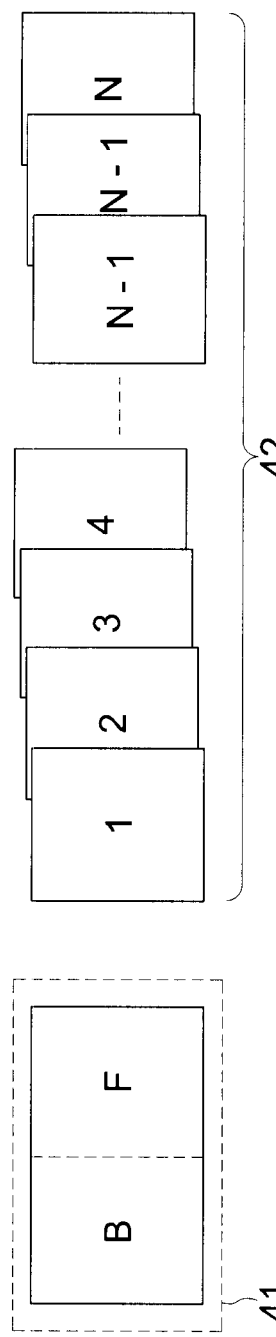
Figure 13C:
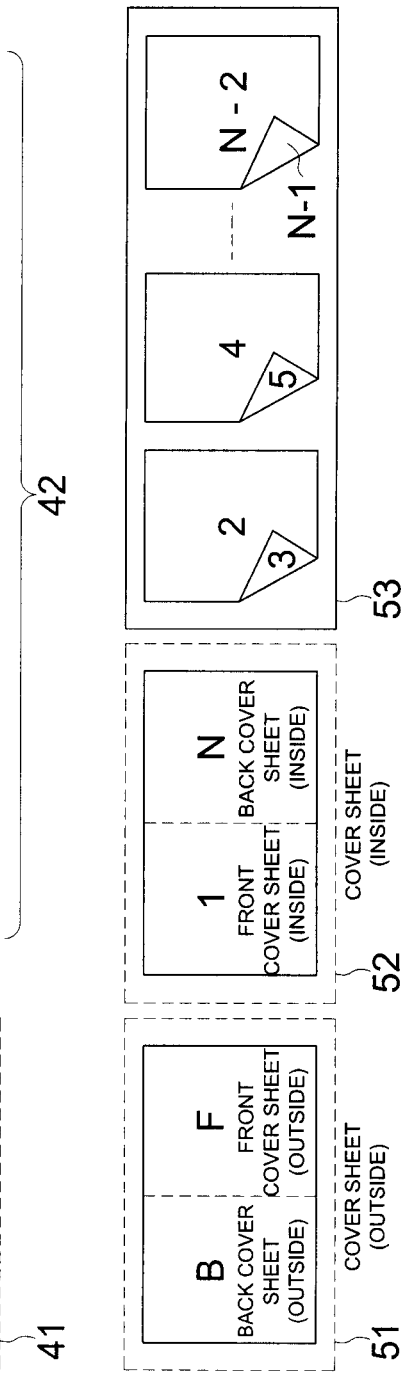
Figure 17A:
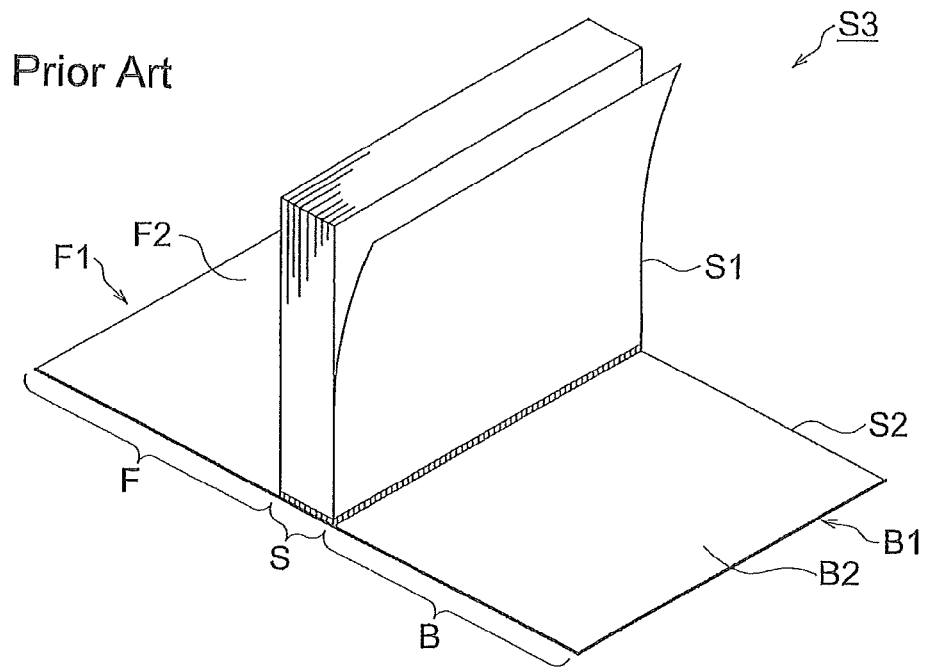
FIGS. 17(*a*) and (*b*) show an example of a book formed with the book binding apparatus.
Figure 17B:
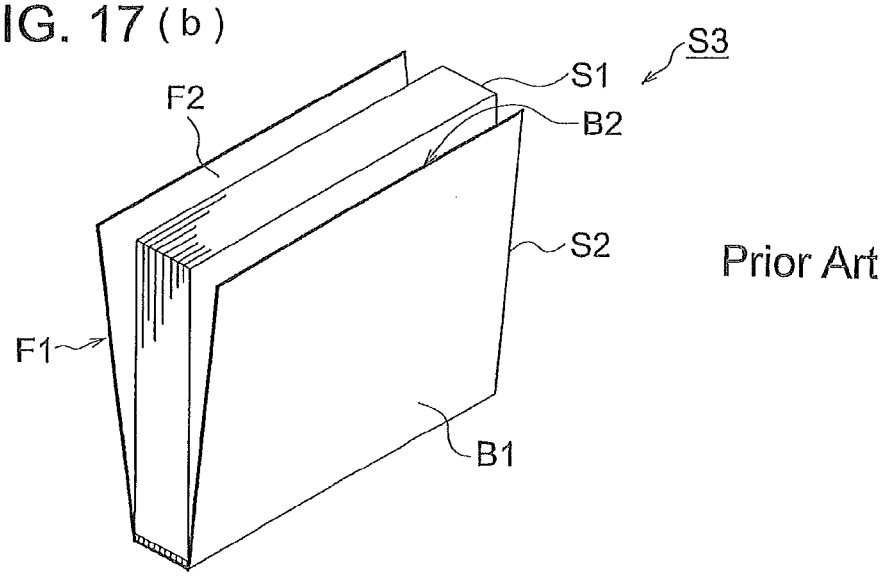

FIGS. 13(a)-(c) are charts showing the relationship between the reading of book original and outputting on cover sheet S2 and sheet S1. This is the example in cases where condition settings for reading and outputting are conducted as shown in FIG. 12.

FIG. 13(a) is an explanatory chart showing the reading procedure of the book original. The book original shown in FIG. 13(a) comprises front cover sheet (F), back cover sheet (B), and N original pages. The book original is placed on original platen 31 with two-page spread state as shown in FIG. 13(a), and image reading section A30 performs reading with (1+N/2) time scans.

FIG. 13(b) is an explanatory chart showing the memorized status of the image data having been read-in, correlated to the book information, and memorized in image memory 106A. Designation 41 indicates image data for the cover sheet, and designation 42 indicates the other image data. In the first time scanning, based on the setting of reading condition (book information) "full face of cover sheet reading" set on the screen of FIG. 12, front cover sheet (F) and back cover sheet (B) are collectively read with two-page spread state and are memorized in image memory 106A as a single page image. Subsequently, from the second time scanning, based on the setting of reading condition (book information) of "left side stitching" and "two-page spread reading", images of the left and right halves of the book original in the two-page spread state are memorized as two pages of image data in image memory 106A. In the example shown in FIGS. 13(a)-(c), the image size of cover sheet image data 41 is A3, for example, and the size of other image data 42 is A4, which being half size of cover sheet image data 41. Two-page spread reading of the above example is a method where the full face of the image data read-in by a single time scanning is divided into two pages of right and left image data, however the other method is possible where image reading section A30 executes two time scans to read-in right and left halves of the image by a single instruction operation of the operator (procedures to this point correspond to steps S13 and S32).

FIG. 13(c) shows the state where images are formed on cover sheet S2 and sheet S1 based on the image data shown in FIG. 13(b). On outside face 51 of cover sheet S2, images are formed based on image data 41. On inside face 52 of cover sheet S2, images are formed based on images previously combined first page 1 and last page N. Then, on both faces of sheet S1 (number 53), images are formed based on the image data from page 2 to page N−1.

In book binding apparatus B, a plurality of sheets S1 are bundled to a bundle of sheets, and cover sheet S2 is connected to the bundle of sheets to encase the bundle in U-shaped state, then a book is formed (procedures to this point correspond to steps S33).

The example described above is the case where "full face of cover sheet reading" is set as the reading condition. In the case where "front cover/back cover reading" is set, front cover sheet F and back cover sheet B are respectively placed on original platen 31 in closed state (not the two-page spread state), and two separate A4 size image data are read-in to be memorized in image memory 106A, and then at the time of outputting, images are formed based on composed image data in which two separate images are combined to be A3 size.

Next, example of forming a book based on book information inputted through inputting section A4 will be described.

FIGS. 14(a)-(c) show relationships between a setting of starting position for content image and an outputting state. Here, the content image means image data of the page other than outside of cover sheet, and corresponds to image data from page 1 to page N in sign 42 of FIG. 13(b). A starting position of the content image is set by selecting any one of buttons in A46 of FIG. 12. This setting enables to change a page configuration to output the content image data.

In an initial condition, the setting of content image starting position is "cover sheet (inside) button A46a" in FIG. 12, and in this case, the outputting state onto cover sheet S2 and sheet S1 is shown in FIG. 14 (a). According to the setting of "title leaf button A46b", the content image starting position is the title leaf, which is the first page of sheet S1, and the outputting state is as shown in FIG. 14(b). According to the setting of "title leaf (back) button A46c", the content image starting position is back face of the title leaf, which is the second page of sheet S1, and the first page being blank. In this case, the outputting state is as shown in FIG. 14(c).

In the outputting state shown in FIG. 14(a), an output of the same configuration as that of the book original, having been read, is obtained. Configurations of FIGS. 14(b) and (c) are selected in cases where image formation on inside the cover sheet is not wanted. Further, by the configuration of FIG. 14(c), each sheet S1 of the outputted book has the same front/back output images as those of the book original. Wherein, the title leaf means the first sheet of sheet S1.

In this way, by outputting the book based on the setting of content image starting position as the book information inputted through inputting section A4, it becomes possible to arrange the images properly on the inside of the cover sheet.

FIGS. 15(a)-(b) are charts for explaining a method of determining the size for whole cover sheet image reading based on thickness information. FIG. 15(a) shows a book original having lateral length "a", and thickness information or spine width of "b". FIG. 15(b) shows the image data read-in based on lateral size of whole cover sheet image reading "2a+b", which is determined based on the size information and the thickness information of the book original. For example, when size of the book original is A4 (lateral length 21 mm, longitudinal length 297 mm), "a" is 210 mm, and when spine width "b" is 10 mm, the reading size becomes lateral length of 430 mm and longitudinal length of 297 mm.

To conduct case-binding processing, the cover sheet size needs to be selected to be larger size than the above reading size. For example, a method is possible where A3 extended size is selected as the size of cover sheet, and excessive portions are trimmed to be a proper size by trimming section 70.

Setting of spine width "b" is conducted by pressing spine width button 456 in FIG. 12 to switch the screen to spine width inputting screen (not illustrated), and by inputting numeral values on the screen. Instead of inputting the spine width, the spine width may be determined by calculating with information of total pages of the book original and sheet thickness information previously inputted.

In this way, by the image forming system and the program for controlling the image forming system, in which reading of cover sheets and book body is conducted based on the book information inputted through the inputting section, and the read-in image data is memorized in the memory section in correlation with the book information, it is enabled to easily output a book having the same configuration as that of a book original when coping the book original.

What is claimed is:

1. An image forming system, comprising:
  an image reading section, which is capable of reading-in an image of a book original;
  a memory section to memorize image data read-in;
  an image forming section to form images on sheets to be a book body and on a cover sheet based on the image data;
  a book binding apparatus to form a book by covering a bundle of the sheets, on which the images are formed, with the cover sheet;
  an inputting section which displays a first operation screen to input reading conditions of the book original and a second operation screen, which is separate from the first operation screen, to input outputting conditions of the book binding apparatus, wherein the reading conditions include at least a condition of a book copy function where the book original in two-page spread state is read-in with a single time scanning to generate image data of two separate right and left pages, a condition of a stitching side of the book original, and a condition of reading of a cover sheet of the book original; and a control section to automatically set the outputting conditions based on a setting of the reading conditions inputted through the first operation screen of the inputting section, and display the automatically set outputting conditions on the second operation screen.

2. An image forming system, comprising:

an image reading section, which is capable of reading-in an image of a book original;

a memory section to memorize image data read-in;

an image forming section to form images on sheets to be a book body and on a cover sheet based on the image data;

a book binding apparatus to form a book by covering a bundle of the sheets, on which the images are formed, with the cover sheet;

an inputting section which displays a first operation screen to input a setting of reading conditions of the book original, and a second operation screen, which is separate from the first operation screen, to input a setting of outputting conditions of the book binding apparatus, wherein the reading conditions include at least a condition of a book copy function where the book original in two-gage spread state is read-in with a single time scanning to generate image data of two separate right and left pages, a condition of a stitching side of the book original, and a condition of reading of a cover sheet of the book original; and a control section to determine consistency of the setting of outputting conditions inputted through the second operation screen with the setting of reading conditions inputted through the first operation screen.

3. The image forming system of claim 2, wherein the control section displays an alarm display in cases where the setting of outputting conditions inputted through the second operation screen are determined to be inconsistent with the setting of reading conditions inputted through the first operation screen.

4. A non-transitory computer readable recording medium having a program stored thereon, the program being readable by a computer for controlling an image forming system, which comprises an inputting section which displays a first operation screen to input reading conditions of a book original and a second operation screen, which is separate from the first operation screen, to input outputting conditions of a book binding apparatus, an image forming section to form images based on image data obtained by reading the book original, and the book binding apparatus to form a book by covering a bundle of sheets, on which the images are formed, with a cover sheet, wherein the program allows the computer to execute the steps of:

receiving reading conditions, of the book original, inputted through the first operation screen of the inputting section, wherein the reading conditions include at least a condition of a book copy function where the book original in two-page spread state is read-in with a single time scanning to generate image data of two separate right and left pages, a condition of a stitching side of the book original, and a condition of reading of the cover sheet of the book original;

automatically determining outputting conditions of the book binding apparatus based on the reading conditions inputted through the first operation screen;

executing to read-in images of a cover sheet and a book body of the book original;

displaying the automatically determined outputting conditions on the second operation screen; and allowing the book binding apparatus to form a book based on the determined outputting conditions.

5. A non-transitory computer readable recording medium having a program stored thereon, the program being readable by a computer for controlling an image forming system, which comprises an inputting section which displays a first operation screen to input reading conditions of a book original and a second operation screen, which is separate from the first operation screen, to input outputting conditions of a book binding apparatus, an image forming section to form images based on image data obtained by reading the book original, and the book binding apparatus to form a book by covering a bundle of sheets, on which the images are formed, with a cover sheet, wherein the program allows the computer to execute the steps of:

receiving reading conditions, of the book original, inputted through the first operation screen of the inputting section, wherein the reading conditions include at least a condition of a book copy function where the book original in two-page spread state is read-in with a single time scanning to generate image data of two separate right and left pages, a condition of a stitching side of the book original, and a condition of reading of a cover sheet of the book original;

receiving outputting conditions, of the book binding apparatus, inputted through the second operation screen of the inputting section;

determining consistency of the outputting conditions of the book binding apparatus inputted through the second operation screen with the reading conditions of the book original inputted through the first operation screen; and executing an alarm based on a result of determining the consistency.

* * * * *